M. Marshall.
Loom.

No. 947.

Reissued Apr. 24, 1860.

M. Marshall.
Loom.

No. 947. Reissued Apr. 24, 1860.

Sheet 3-4 Sheets.

M. Marshall.
Loom.

No. 947. Reissued Apr. 24, 1860.

M. Marshall.
Loom.

Sheet 4 - 4 Sheets.

No. 947.

Reissued Apr. 24, 1860.

UNITED STATES PATENT OFFICE.

MOSES MARSHALL, OF LOWELL, MASS., ASSIGNOR TO GEORGE CROMPTON.

IMPROVEMENT IN LOOMS FOR WEAVING FIGURED FABRICS.

Specification forming part of Letters Patent No. 6,939, dated December 11, 1849; Reissue No. 947, dated April 24, 1850.

*To all whom it may concern:*

Be it known that I, MOSES MARSHALL, of Lowell, in the State of Massachusetts, have invented a new and useful Improvement in Looms for Weaving Figured Fabrics, of which the following is a full, clear, and exact description, reference being had to the accompanying drawings, making part of this specification, in which—

Figure 1:
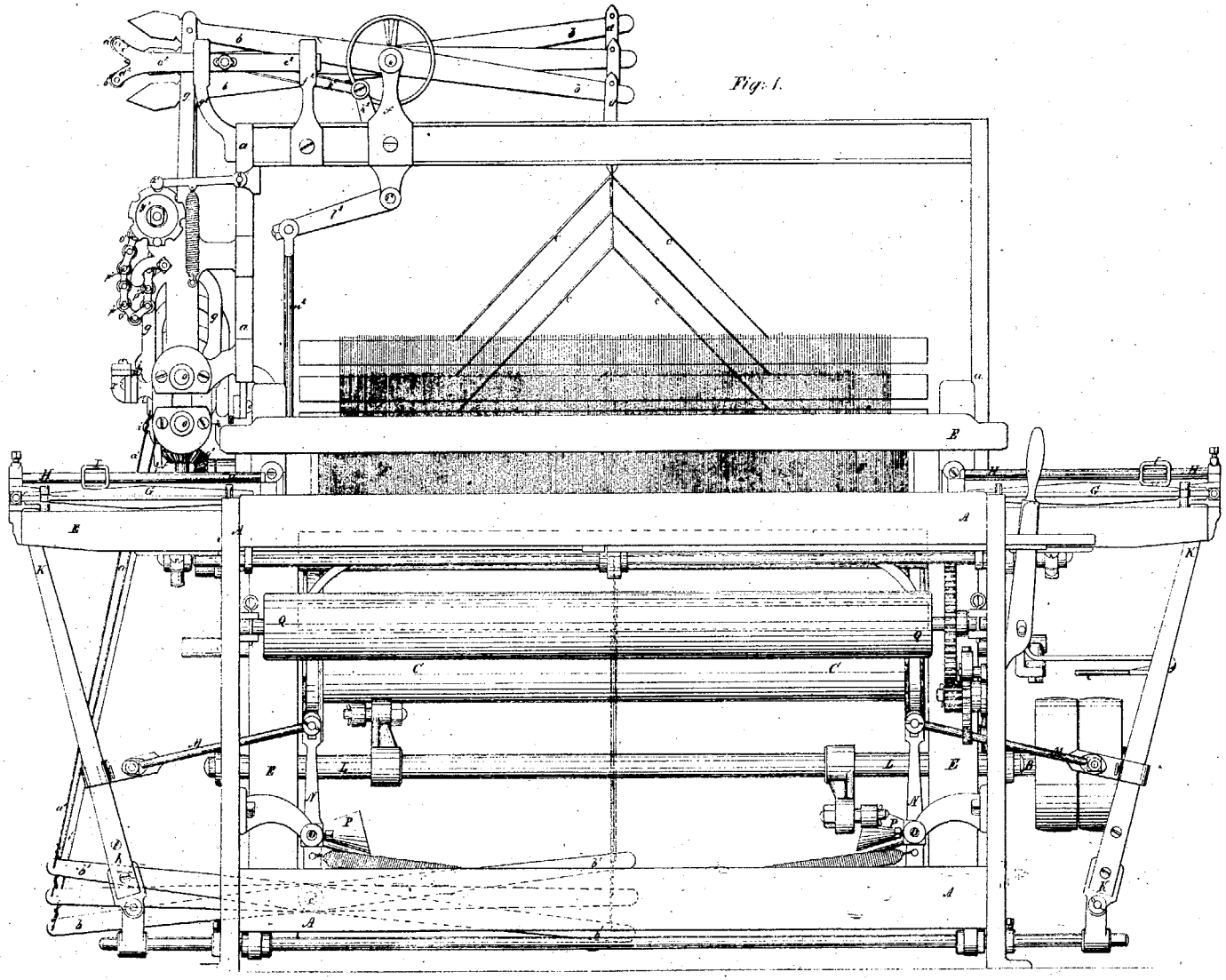
Figure 2:
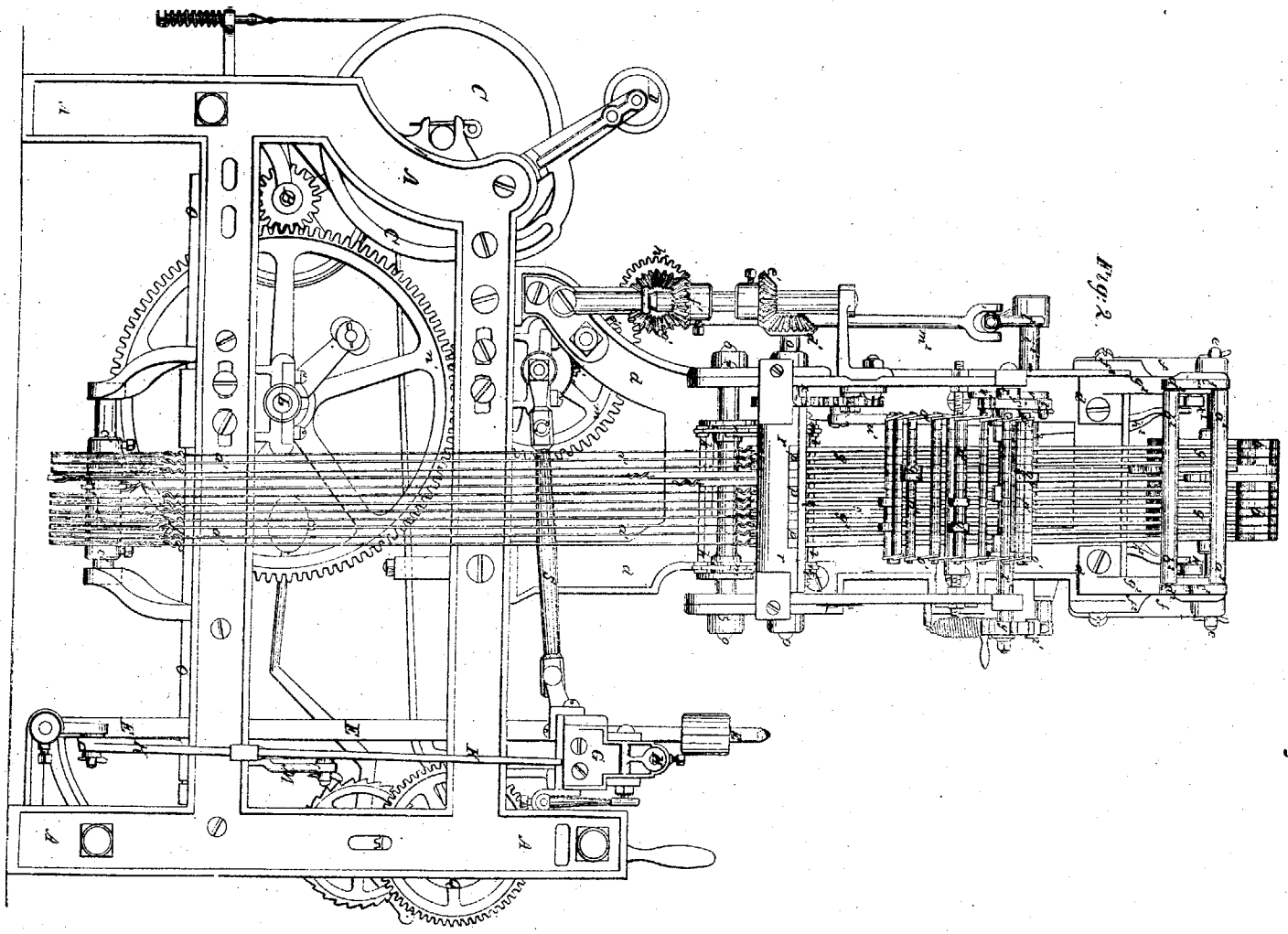
Figure 3:
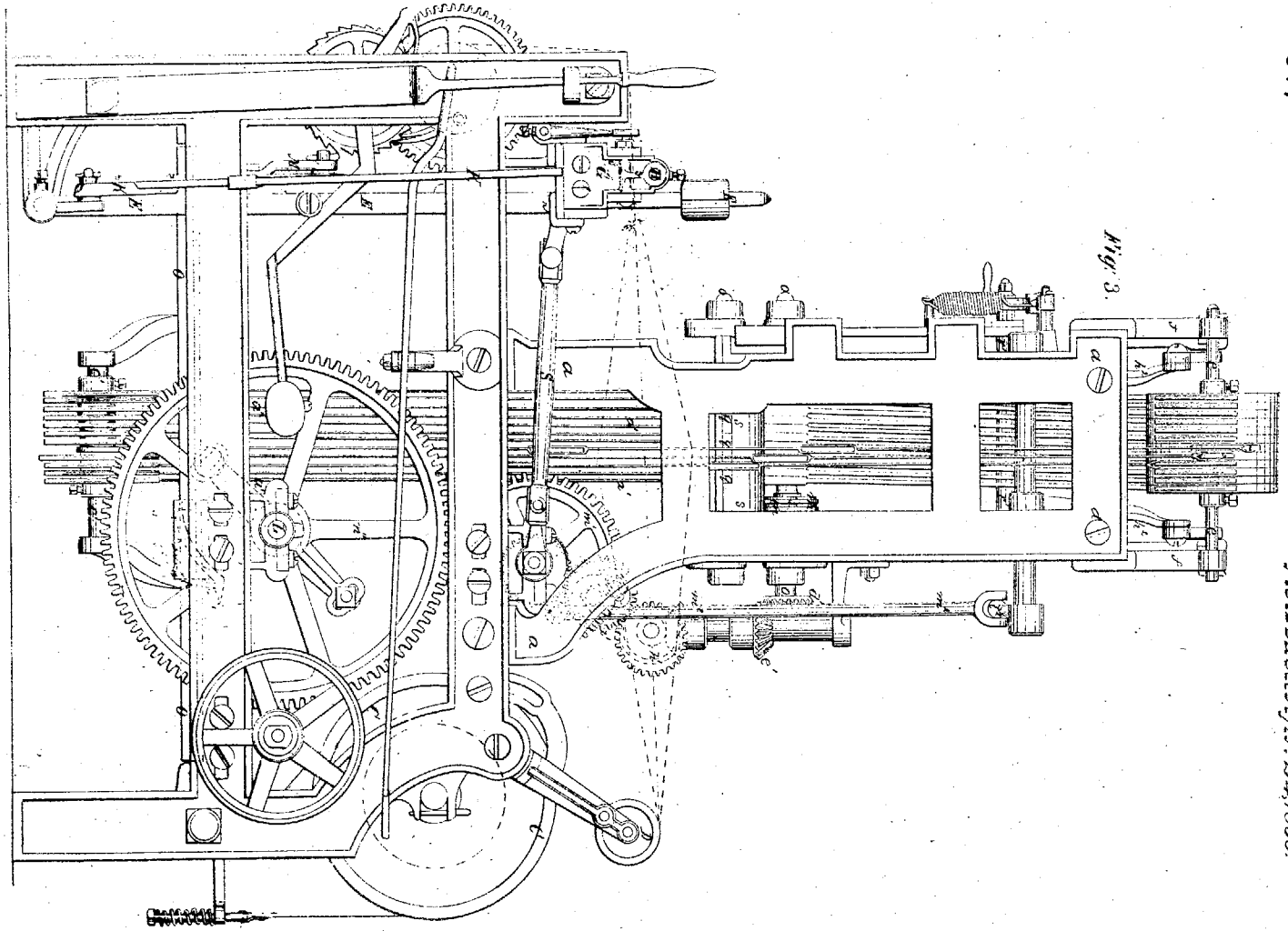
Figure 4:
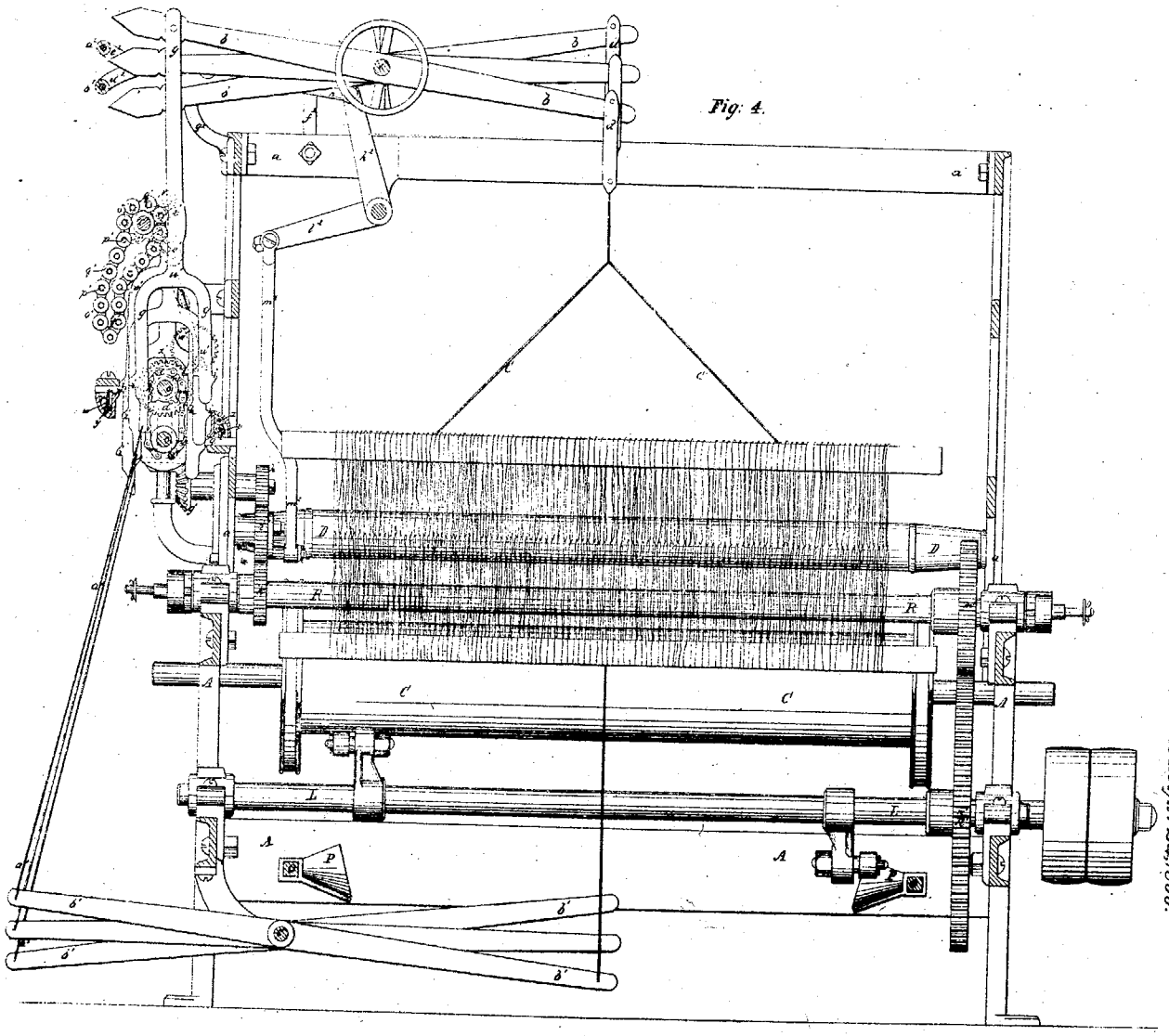

Figure 1 is a front elevation of a loom with the said improvement applied thereto; Fig. 2, an elevation of one end; Fig. 3, an elevation of the opposite end; and Fig. 4 is a vertical section taken at a plane just in front of the cam-shaft, and parallel with the front of the loom.

The same letters indicate like parts in the several figures.

My invention relates to improvements in that class of looms for weaving figured and fancy fabrics in which a series of leaves of heddles are operated by jacks elevated and depressed by a lifter and depressor as their position is determined to suit the design to be woven by a pattern-chain, or any of the known equivalent devices for determining the pattern; and the object of the first part of my invention is to avoid moving any of the leaves of heddles which are not required to be moved for the production of the design during any part of the operation, so that the movement of the heddles and warps in closing and opening the sheds shall be limited to such of the warps as are at the time actually required for the production of the design or face of the fabric; and to this end this part of the said invention consists in combining with the series of jacks that lift and depress the leaves of heddles, with a lifter and depressor for lifting and depressing the jacks, and with a pattern-chain or other equivalent device for placing the jacks in position to be lifted or depressed, a mechanism for holding any of the jacks either in their elevated or depressed position, when the pattern-chain or equivalent device does not indicate that they are required to be shifted for the production of the fabric; that is at the time being woven; and the second part of my invention, which relates to the method of lifting and depressing the jacks by what are known as "lifters" and "depressors," consists in imparting an irregular motion to the lifters and depressors by means of eccentric cog-gearing, so timed relatively to the motions of the loom that the lifter and depressor shall move with the greatest velocity at the time the warps are crossing to close a shed and open another, the period of so closing the shed being at or about the time the lay beats up the weft-thread, so that the warps shall close upon the weft-thread before it is relieved by the back movement of the lay. In this way a much closer fabric can be woven than by crossing the warps as the lay returns. To effect the purpose so indicated, it is important that the heddles should be operated rapidly at the time of beating up the weft-thread, as the weft-thread should be forced home before the shed closes, and the crossing of the warps should take place during the instant of time that the lay stops to return The detailed construction of the several parts above referred to, and their connected operation, are explained in the sequel; but it will be necessary, in order to avoid confusion, to first refer to the main parts of the loom, which are old and in common use.

A in the several drawings is the main framework of the machine.

B is the driving-shaft.

C C is the warp-beam from which the warp-threads pass over the smaller roller, D D, set just above.

E is the lay, with its reed F and shuttle-boxes G G. Over each of the said boxes is a picker-rod, H H, on which the pickers I I slide forward and back to throw the shuttle.

K K are the picker levers, or arms which move the pickers, said levers being operated from the cam-shaft L through the medium of the connecting-rods M M and vertical arms N N, extending up from the cross-shaft O O. These cross-shafts are rocked so as to move the picker-arms by means of their bearing-plates P P, on which the cams on the shaft L operate, in a manner which is well known to those acquainted with the art of weaving.

Q Q, Fig. 1, is the cloth-beam on which the fabric is wound during the process of being woven.

R is the shaft which drives the lay by means of the crank-rods S S, Figs. 2. and 3. This shaft also operates the apparatus for working the harness, which apparatus I shall now proceed to explain.

The figuring-apparatus is mounted in a separate or rather auxiliary frame, *a*, attached to or making a part of the main frame of the loom. The series of leaves of heddles, of any number desired, are stretched between the inner ends of two series of levers, *b* and *b'*, which vibrate on short cross-shafts *e* and *e'*. The shaft *e* of the upper series of levers, *b*, is sustained by standards *f f* of the frame *a*, and the shaft *e'* of the lower series is mounted in the lower part of the main frame of the loom. The heddles are connected by reverse oblique cords *c c* and plates *d* with the upper levers, *b*, and with the lower levers, *b'*, by single cords; but the connections may be made in any suitable manner, provided one leaf of heddles be connected with each pair of levers *b b'*. The two series of levers, *b* and *b'*, are connected at their outer ends by a series of jacks, *g*, one of which is connected by any suitable hinge-joint to the outer end of each of the upper levers, *b*, and the lower ends of the jacks are in turn connected by rods *a'* with the outer ends of the lower levers. The lower levers, *b'*, are longer than the upper ones, so that the rods *a'* that form the connections with the jacks *g* are inclined so that the pull on the jacks in operating each leaf of the heddles will tend by reason of the obliquity of rod *a'* to draw its appropriate jack *g* outward, for a purpose to be presently described. It will be observed that each leaf of heddles, no matter what the number may be, has its pair of levers *b b'*, jack *g*, and oblique connecting-rod *a'*, forming the circuit of connection. The jacks *g* are all of them forked at their lower ends, as represented in Fig. 4, the two prongs being parallel, and at such distance apart as to admit of the free working of the elevators and depressors *l k* between them. These are simply two bars, *l k*, connected with and carried by two parallel chains, *m m*, which pass around rollers on two parallel shafts, *o o'*, the upper ones of the said rollers being spurred to engage the links of the chains, and the upper roller, *o*, carries at its outer end a bevel-cog wheel, *d'*, to receive motion from the loom, in manner to be presently described. On the inner edge of each prong of the forked jacks there is a shoulder, *h*, the square face of the shoulder being upward on the outer prong and downward on the inner prong, so that as the lifting and depressing bars *l k*, carried by the chain *m m*, or either of them, moving down they will strike on the shoulder *h* of the outer prongs of the jacks to depress them, and while moving up they will strike under the shoulder *h* of the inner prongs to elevate them. And it will be seen that when any one jack is depressed the corresponding leaf of heddles will be elevated to carry up that portion of warp-threads which it controls; and, vice versa, when any one jack is elevated, the corresponding leaf of heddles will be carried down, and with it that portion of the warp which it controls. The distance between the prongs of the jacks is such that the bars *l k* cannot strike the shoulders on the two prongs at the same time; and the tension of the oblique rods *a'* tends constantly to draw the lower end of the jacks outward that the shoulder *h* on the inner prongs may be within reach of the bars *l k* when moving up, that they may be elevated, and this self-same tension tends to keep the shoulder *h* on the outer prongs beyond the reach of the bars *l k* when descending. These jacks are moved into position to be operated by the lifter or depressor, by the rollers *q'* acting like cams on what is known as a "pattern-chain." These roller-cams *q'* are mounted on rods *p'*, attached to two chains *o' o'*, carried by wheels on a horizontal shaft, *r'*, turned by a ratchet-wheel, *s'*, in manner to be presently described, to carry off one set of roller-cams and bring the next into action, as is well known to persons acquainted with this class of looms. The jacks are slightly curved where the roller-cams *q'* act upon them. Wherever there is a roller-cam *q'* on that one rod, *p'*, of the pattern-chain which is brought into action, it will act on the jack opposite thereto and push it inward, so that if it be at the time in an elevated position the shoulder *h* on its outer prong will be in a position to be acted upon by the depressor-bar *l* or *k*, by which it will be carried down; but if at such time the jack be in a depressed position, the bars *l k* will not act on it because the shoulder *h* of the outer prong is as low as the range of action of the bars *l k* and the shoulder *h* of the inner prong is beyond their reach; but such of the jacks as are depressed and are opposite to a portion of the pattern-chain, which, for the time being, has no roller-cam *q'* on it, will be drawn outward by the tension of the oblique rod *a'*, so that the shoulder *h* of its inner prong will be acted upon by one of its bars *l k*, and thereby elevated. In this way at each operation one of the bars *l* or *k* will descend, depressing such of the jacks as have been shifted to come within its range, while the other bar will ascend, lifting others of the jacks, thus forming an open shed of such portions of the warp as are controlled by the corresponding leaves of the heddles.

It is important that such portions of the warp-threads as are not required to be interwoven during any pick or series of picks should be held in either a depressed or elevated position, as the nature of the fabric may require them to appear either on the upper or the lower surface of the fabric when completed. To accomplish this there is a mechanism whose sole function is to hold the jacks either in an elevated or depressed position, as the case may be. There is on the outer edge of the two prongs of each jack a shoulder, *i i*, the reverse of the shoulders *h* on each prong, and there are two series of horizontal spring latches or catches, *p* and *q*, the series *p* corresponding with the shoulders *i* of the outer prongs of the jacks and at the required height to hold the jacks in the required elevated position, and the other series, $q$, corresponding with the shoulders $i$ on the inner prongs, and so low as to hold the jacks down to their lowest position. Both series, $p$ $q$, are beveled on one face like the latch of a door. The shoulders $i$ $i$ are beveled in like manner, but on the opposite face.

The series of latches $p$ are fitted to and are capable of sliding freely in a bar, $r$, of the frame $a$, and the series $q$ in like manner in a similar bar, $s$. The bars $r$ and $s$ are hollow, and within each is mounted an arbor with a wing, $v$, which is made to bear, by a spring coiled on the arbor, against a spur on each of the latches. In this way all the latches are held in their required position, ready to spring back when the bevel of the shoulders $i$ of the jacks come in contact when moving in one direction, and to spring out to hold the jacks in position, whether elevated or depressed, as the case may be, the series $p$ being to hold them in their elevated position, and the other series, $q$, to hold them in their depressed position. When held in their elevated position, any of the jacks will remain so until they are forced inward by roller-cams, $q'$, on the pattern-chain, which are brought around to act on them, and when any of them are held in the depressed position they will remain so until some section of the chain without roller-cams in it comes opposite to them, and then they will be liberated from the latches by the tension of the oblique rod $a'$, which will draw them outward, ready to be elevated.

It will be obvious that this part of my invention is not dependent upon the use of a pattern-chain, as it can be used in connection with any other device for determining the design to be woven by shifting the jacks or their equivalents into position to be elevated or depressed. Nor is it dependent upon the use of chains for carrying the lifting or depressing bars in a continuous circuit, as it is equally applicable to looms in which the jacks are elevated or depressed by the well known reciprocating lifters and depressors, as in the well-known Compton loom. Nor is it dependent upon the form of jacks herein described, as these may be greatly varied without departing from the principle or mode of operation resulting from the introduction in a figuring-loom of this class of a mechanism for holding the jacks either in an elevated or depressed position, so long as the design of the fabric does not require them to be shifted, and although but one mode of applying this part of the said invention is herein described, like all other inventions, the mode of application may be greatly varied without departing from the principle or mode of operation which distinguishes it from all other things before known.

The bevel-wheel $d'$ on the shaft $o$, which gives motion to the elevator and depressor bars $l$ $k$, receives motion from a bevel-wheel, $e''$, on a vertical shaft, which in turn carries another bevel-wheel, $f'$, that receives motion from a corresponding bevel-wheel, $g'$, on a horizontal shaft, which carries an eccentric spur-wheel, $h'$, that receives motion, by an intermediate eccentric wheel, $i'$, from another eccentric-wheel, $k'$, on the shaft R, this latter shaft deriving motion from the cam-shaft L by cog-wheels $m'$ $n'$ at the opposite side of the loom. The object of this eccentric gearing is to give a varying motion to the lifter and depressor bars $l$ $k$, so that in shedding the warps the motion shall be quickest when the descending and ascending warps cross each other, and this, as represented, takes place just as the lay beats up the weft, so that the warps shall close it in before the reed leaves it. By means of this a much closer fabric can be woven than if the lay is permitted to move back before the crossing of the warps. The pattern-chain, as it is termed, is composed of two endless chains, $o'$ $o'$, between which are stretched the cross-rods $p'$ $p'$ $p'$, on which the circular cams or rollers $q'$ $q'$ $q'$ are arranged with interposed washers, so that they can be shifted along on said rods to vary the pattern by operating on different jacks against which they press. This pattern-chain, with its rollers and rods, is hung over and is turned with the shaft $r'$ $r'$, Fig. 2, which shaft is revolved by means of a ratchet-wheel, $s'$, on one end of said shaft, operated by the catch $t'$, said catch being moved by a crank-rod, $u'$ $u'$. (Shown by dotted lines in Fig. 4.) One end of this crank works in a slot of one arm of a right-angular lever, $v'$ $v'$, to the other arm of which the catch $t'$ is connected, as shown by dotted lines in said Fig. 4. The other end of the crank-rod is connected eccentrically to the face of the gear-wheel $w'$, which receives motion from the gear-wheel $x'$ on the upper shaft, $o$ $o$, which carries the lifter and depressor bars $l$ $k$, as hereinabove explained. The motions of the pattern-chain are regulated by the notched wheel $y'$, on the front end of the shaft $r'$ $r'$, and spring-pawl $z'$, arranged as shown clearly in Fig. 1. It now only remains to describe the "evener," as it is termed, which works with the heddle or harness levers so as to assist in shifting the sheds and to keep said levers in accurate position for the operation of the cams. This evener consists of two rollers, $a^2$ $b^2$, which are set and have bearings on the forked ends $c^2$ $d^2$ of two horizontal bars, $e^2$ $e^2$, said bars being arranged so as to move forward and back in proper guides or holes formed in the uprights and curved-supports $f^2$ $g^2$, attached to the top of the frame-work $a$. These rollers press against the outer ends of the upper harness-levers, $b$ $b$, which are beveled for the purpose, as shown in Figs. 1 and 4, and, as will be obvious, serve the purpose, as hereinafter suggested. A reciprocating rectilinear motion is imparted to this evener by means of the crank-arms $h^2$ $h^2$, on opposite ends of the shaft $i^2$ $i^2$, having proper bearings depending from the frame-work $a$, said crank-arms being attached to one end of the connecting-rods $k^2$ $k^2$, the other ends of which rods are connected to the sliding bars $e^2$ $e^2$, as shown in Fig. 1. The shaft $i^2$ is vibrated or rocked so as to give the requisite motion to the evener through the medium of the several parts arranged or connected, as above described, by means of the crank-arm $l^2$ and connecting-rod $m^2$, the lower end of which is attached eccentrically to the middle wheel, $i'$, of the eccentric-gears, hereinabove referred to, in the machinery for driving the jacks.

What I claim as my invention, and desire to secure by Letters Patent, is—

1. Combining with the jacks that operate the series of leaves of heddles, and with the lifter and depressor and pattern-chain, or any equivalent apparatus for determining the pattern, a mechanism for holding the jacks either in their elevated or depressed position when not required to be operated, substantially as and for the purpose specified.

2. Imparting an irregular motion, substantially such as herein described, to the jacks by means of eccentric cog-wheels, substantially as and for the purpose specified.

MOSES MARSHALL.

Witnesses:
DAVID LANE,
WARREN ALDRICH.